(12) United States Patent
Salesse-Lavergne

(10) Patent No.: US 9,682,768 B2
(45) Date of Patent: Jun. 20, 2017

(54) FLIGHT CONTROL SYSTEM AND METHOD WITH TRACK MAINTENANCE FOR A ROTARY WING AIRCRAFT

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 95 days.

(21) Appl. No.: 14/750,726

(22) Filed: Jun. 25, 2015

(65) Prior Publication Data

US 2015/0375849 A1    Dec. 31, 2015

(30) Foreign Application Priority Data

Jun. 30, 2014    (FR) ..................................... 14 01470

(51) Int. Cl.
*B64C 13/18*    (2006.01)
*G05D 1/08*    (2006.01)
*B64C 27/04*    (2006.01)

(52) U.S. Cl.
CPC .............. *B64C 13/18* (2013.01); *B64C 27/04* (2013.01); *G05D 1/0858* (2013.01)

(58) Field of Classification Search
CPC .......... B64C 13/18; B64C 27/57; B64C 27/04
USPC ........................ 701/3, 4, 5, 6, 11; 244/17.13
See application file for complete search history.

(56) References Cited

U.S. PATENT DOCUMENTS

| | | |
|---|---|---|
| 4,664,346 A | 5/1987 | Koenig |
| 5,001,646 A | 3/1991 | Caldwell et al. |
| 5,008,855 A | 4/1991 | Eltoukhy et al. |
| 5,195,700 A | 3/1993 | Fogler, Jr. et al. |

(Continued)

FOREIGN PATENT DOCUMENTS

| | | |
|---|---|---|
| EP | 0455580 A2 | 11/1991 |
| EP | 0455580 A3 | 11/1991 |

(Continued)

OTHER PUBLICATIONS

French Search Report for French Application No. FR 1401470, Completed by the French Patent Office on Apr. 14, 2015, 5 Pages.

(Continued)

*Primary Examiner* — Tan Q Nguyen
(74) *Attorney, Agent, or Firm* — Brooks Kushman P.C.

(57) ABSTRACT

A flight control system for a rotary wing aircraft, the aircraft following a track $T_{sol}$, relative to the ground with a ground course angle $TK_{sol}$, a forward speed Va, a flight path angle P, and a heading $\Psi$, the aircraft having one or more rotary wings provided with blades of collective pitch and of cyclic pitch that are variable about respective pitch axes and that are capable of performing movements in rotation and in translation. The flight control system has two control members each provided respectively with at least one movement axis A, B, C, D, and an autopilot for generating control signals. An action on one of the control members relative to one of the movement axes A, B, C, D gives rise independently to a modification to the forward speed Va, to the ground course angle $TK_{sol}$, or indeed to the flight path angle P by means of the autopilot.

18 Claims, 1 Drawing Sheet

(56) References Cited

U.S. PATENT DOCUMENTS

| | | |
|---|---|---|
| 5,213,283 A | 5/1993 | Gold et al. |
| 6,070,829 A | 6/2000 | Bellera et al. |
| 6,259,975 B1 | 7/2001 | Rollet et al. |
| 6,622,065 B2 | 9/2003 | Mezan |
| 7,427,046 B2 | 9/2008 | Bellera |
| 8,392,037 B2 | 3/2013 | Sahasrabudhe et al. |
| 8,788,123 B2 | 7/2014 | Salesse-Lavergne et al. |
| 8,840,057 B2 | 9/2014 | Moret |
| 8,977,412 B2 | 3/2015 | Certain |
| 8,989,921 B2 | 3/2015 | Nannoni et al. |
| 2011/0036954 A1 | 2/2011 | Piasecki |
| 2012/0153074 A1 | 6/2012 | Nannoni et al. |

FOREIGN PATENT DOCUMENTS

| | | |
|---|---|---|
| EP | 0601122 | 3/1997 |
| EP | 1607327 | 12/2005 |
| EP | 2574546 | 4/2013 |
| EP | 2597035 | 5/2013 |
| FR | 1347243 | 12/1963 |
| FR | 2756252 | 5/1998 |
| FR | 2777535 | 10/1999 |
| FR | 2814433 | 3/2002 |
| FR | 2991664 | 12/2013 |
| WO | 9305461 | 3/1993 |
| WO | 9534029 | 12/1995 |
| WO | 9955582 A2 | 11/1999 |
| WO | 9955582 A3 | 11/1999 |
| WO | 9964942 A2 | 12/1999 |
| WO | 9964942 A3 | 12/1999 |
| WO | 2012096668 | 7/2012 |
| WO | 2012134447 A2 | 10/2012 |
| WO | 2012134447 A3 | 10/2012 |
| WO | 2012134460 | 10/2012 |
| WO | 2013012408 | 1/2013 |

OTHER PUBLICATIONS

French Search Report for French Application No. FR 1401474 Completed by the French Patent Office on Apr. 24, 2015, 11 Pages.
French Search Report for French Application No. FR 1401479 Completed by the French Patent Office on Apr. 24, 2015, 11 Pages.
Non-Final Office Action for U.S. Appl. No. 14/750,731, Completed by the United States Patent and Trademark Office on Nov. 4, 2016, 14 pages.
Notice of Allowance for U.S. Appl. No. 14/750,739, Completed by the United States Patent and Trademark Office on Nov. 2, 2016, 14 pages.

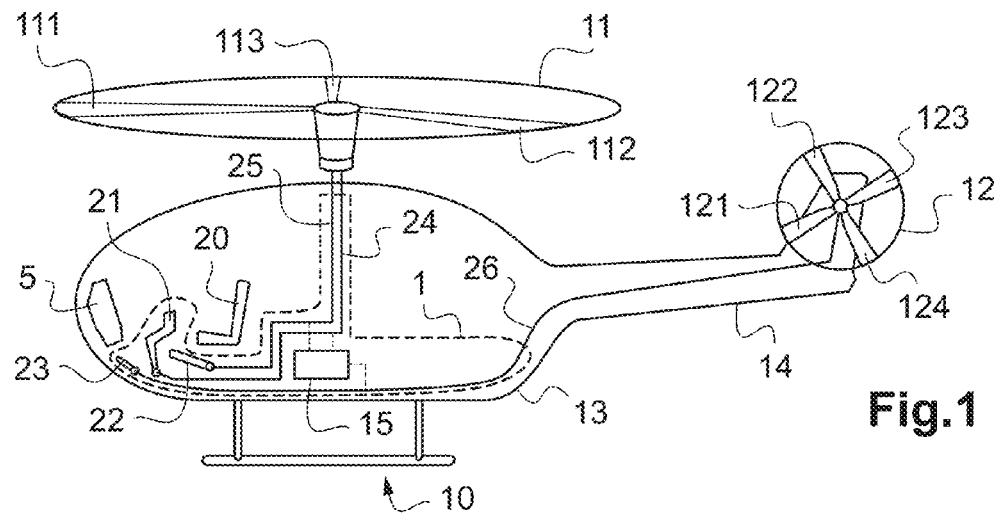
Fig.1
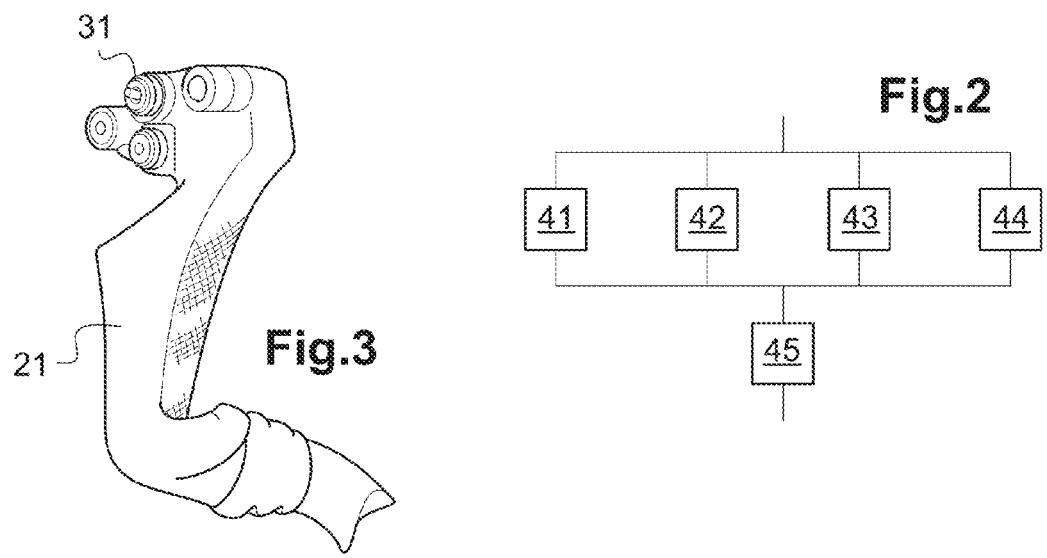
Fig.3
Fig.2
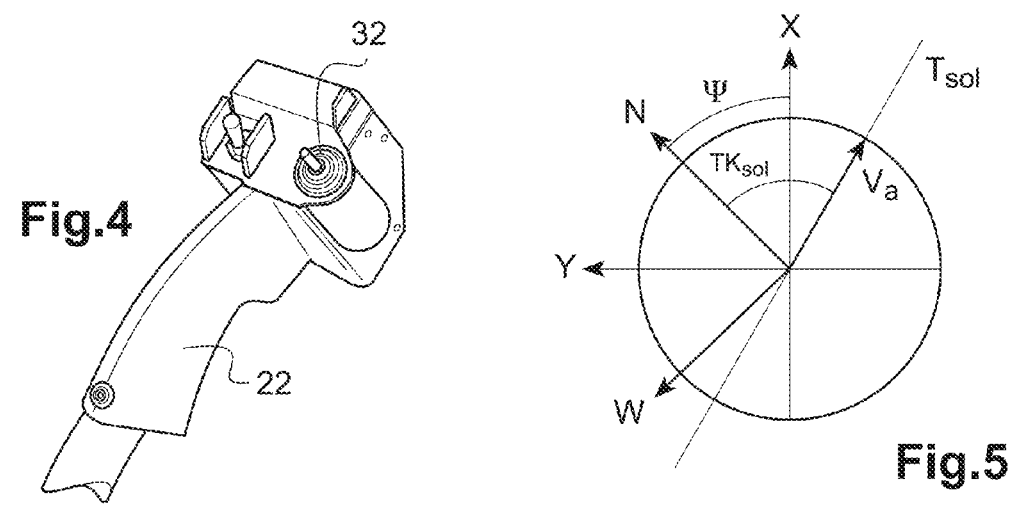
Fig.4
Fig.5

FLIGHT CONTROL SYSTEM AND METHOD WITH TRACK MAINTENANCE FOR A ROTARY WING AIRCRAFT

CROSS REFERENCE TO RELATED APPLICATION

This application claims priority to French patent application No. FR 14 01470 filed on Jun. 30, 2014, the disclosure of which is incorporated in its entirety by reference herein. This application is related to U.S. application Ser. No. 14/750,731 entitled "A Flight Control System And Method For A Rotary Wing Aircraft, Enabling It To Maintain Either Track Or Heading Depending On Its Forward Speed filed on Jun. 25, 2015 and U.S. application Ser. No. 14/750,739 entitled "A Method And System For Engaging Hovering Flight For A Rotary Wing Aircraft, Enabling It To Maintain Either Track Or Heading Depending On Its Forward Speed" filed on Jun. 25, 2015.

BACKGROUND OF THE INVENTION (1) Field of the Invention

The present invention relates to the field of flight control systems for rotary wing aircraft, and more particularly to the field of providing assistance in using flight controls, such as an autopilot.

The present invention relates to a flight control system with track maintenance for a rotary wing aircraft, and more particularly a "full envelope" flight control system, i.e. a system that covers not only flight stages close to the ground at low speeds but also flight stages at high altitudes and at high speed. The present invention also relates to a flight control method for a rotary wing aircraft enabling it to maintain track.

(2) Description of Related Art

Rotary wing aircraft are aircraft that differ from other powered aircraft mainly by their ability to travel not only in cruising flight at high speeds, but also at low speeds or while hovering. This capacity is made available by using at least one main rotor of the aircraft, which rotor has an axis of rotation that is substantially vertical.

The main rotor constitutes a rotary wing providing the aircraft with lift and possibly also with propulsion. The behavior of the rotary wing aircraft in flight can be modified by varying the cyclic pitch and/or the collective pitch of the blades of the rotary wing. A variation in the cyclic pitch of the blades modifies the behavior of the aircraft in terms of attitude, and more particularly in pitching and/or in roll. A variation in the collective pitch of the blades leads to a modification in the behavior of the aircraft in terms of lift, making it possible in particular to generate movements along an axis that is substantially vertical, and also along its pitching and roll axes, depending on the attitude of the aircraft.

A rotary wing aircraft can also be maneuvered in yaw, even while stationary, by using a yaw anti-torque device. For example, such an anti-torque device is formed by a tail rotor having an axis of rotation that is substantially horizontal and located at the rear of the aircraft. Such a tail rotor has a plurality of blades, and as a general rule it is only the collective pitch of the blades that can be varied, even though it is also possible for the cyclic pitch to be variable.

A rotary wing aircraft generally has a single main rotor and a single anti-torque tail rotor. Nevertheless, a rotary wing aircraft may also have two contrarotating main rotors, e.g. in tandem or else on the same axis, in which case no anti-torque device is necessary.

Furthermore, a hybrid helicopter is a rotary wing aircraft having at least one main rotor that serves mainly to provide it with lift and to a smaller extent with propulsion, and at least one specific propulsion means such as a propulsive propeller. Such a hybrid helicopter enables large distances to be covered while traveling at a high forward speed. The anti-torque device of such a hybrid helicopter may be formed by at least one of its propulsive propellers. Such a propulsive propeller has a plurality of blades and as a general rule only their collective pitch is variable.

Furthermore, a rotary wing aircraft may have aerodynamic elements such as stabilizers, or even wings, particularly in hybrid helicopters. These aerodynamic elements may have moving parts and they can participate in making the aircraft maneuverable, in particular in cruising flight at high forward speeds.

The flight behavior of a rotary wing aircraft can be varied by modifying various flight parameters of the aircraft. These flight parameters include in particular cyclic and/or collective pitch values for the main rotors and the collective pitch value for the anti-torque rotor and/or the propulsion means, and the aerodynamic elements, if any. These flight parameters can be modified in this way in various control modes. In a manual control mode the pilot of the rotary wing aircraft has control levers that the pilot of the aircraft moves manually in order to vary the flight parameters, and in particular the cyclic and/or collective pitch of the blades of the various rotors by means of manual control linkages. The concept of "manual" should be considered in opposition to the concept of "automatic", without prejudice to the means used by a person for maneuvering the aircraft, which means may in particular be pedals, a control stick, or a joystick.

In an embodiment of a manual control mode, control levers engage respective linkages for mechanically transmitting forces remotely, so as to enable the pilot of the rotary wing aircraft to act mechanically on the blades by using control levers, either directly, or else via servo-controls.

In another embodiment of a manual control mode, the pilot moving a control lever serves to generate electrical signals for activating at least one servo-control for moving the blades.

In an automatic control mode, an autopilot generates control signals for those flight parameters and in particular for varying the pitch of the blades of the various rotors by using automatic control linkages. When the autopilot is activated, the control signals take the place of the control signals generated by the pilot acting directly on the control levers for activating the servo-controls.

The autopilot enables the rotary wing aircraft to maintain stable progress in application of previously stored flight setpoints. The actual state of progress of the aircraft is evaluated by the autopilot at a given instant by means of information supplied by a variety of instrumentation on board the aircraft. On the autopilot detecting a difference between the flight setpoints and the actual state of progress of the aircraft, the autopilot acts on the flight behavior of the rotary wing aircraft by means of one or more flight parameters in order to re-establish its actual state of progression in compliance with the flight setpoints.

The pilot of the rotary wing aircraft activates the autopilot by using one or more specific control buttons.

In a stabilization mode performed by the autopilot, an initial setpoint for maintaining the attitude of the rotary wing aircraft may, for example, be defined relative to the state of progression of the aircraft as evaluated from activation of the autopilot. Stabilization mode serves to stabilize the aircraft by the autopilot correcting the attitude of the aircraft relative to the initial setpoint.

In a particular mode of piloting by transparency, the pilot may possibly intervene temporarily on the behavior of the aircraft by using control levers and overriding the control signals generated by the autopilot. The initial flight setpoints are unaffected, any temporary intervention by the pilot on the behavior of the aircraft not leading to any modification to the initial flight setpoints.

It is also known to correct a flight setpoint, such as a setpoint for maintaining attitude, as a function of the actual state of progression of the rotary wing aircraft after the pilot has acted on the control levers. It is also known to enable the pilot of the aircraft to correct an attitude maintaining setpoint by varying the value of that setpoint incrementally, the pilot making use of one or more dedicated control members. For example, two control members may be used of the kind commonly known as "beeps". For example, such control members may be positioned respectively on a collective pitch control lever and on a cyclic pitch control lever generally referred to as a "stick".

Document FR 1 347 243 describes a device for piloting by transparency that enables the pilot to take action either with a return to the initial flight setpoints after the pilot's action ceases or else with new flight setpoints being stored that take account of the action of the pilot.

Also known is Document FR 2 991 664, which describes an automatic system for providing piloting assistance that enables a flight parameter to be maintained on a progression axis of the aircraft while taking account of the action of the aircraft pilot on at least one other axis by using flight control levers while the autopilot of the aircraft is in operation. Various modes of guidance can be selected by the pilot, e.g. giving priority to maintaining a vertical speed or a forward speed or indeed maintaining heading, angle of attack, or flight path angle.

Document FR 2 756 252 describes a flight control system for a rotary wing aircraft enabling the pilot to be made aware of the control margins that remain on the various manual control members of the aircraft in a manner that is simple and accurate. That flight control system is for aircraft having electric flight controls or optical flight controls and for aircraft having an autopilot.

Furthermore, Document EP 2 597 035 describes a flight control method for a hybrid aircraft having a main rotor and at least one propulsion propeller. That method makes it possible from a single movement command, e.g. a longitudinal movement command, to act simultaneously on the cyclic pitch of the blades of the main rotor and on the collective pitch of the blades of each propulsive propeller.

Furthermore, U.S. Pat. No. 5,001,646 describes an automatic control system enabling the pilot to act on the progression of the aircraft by means of a four-axis control member. The pilot can then control longitudinal, lateral, and vertical accelerations of the aircraft and also its angular speed in yaw, while conserving firstly, at low forward speed, a speed relative to the ground that is independent of the heading being followed, and secondly, at high forward speed, a coordinated turn and a flight path angle.

The rotary wing aircraft is stabilized using basic modes, in which, by way of example, the autopilot generates an increase in stability by damping angular movements of the aircraft, or indeed it serves to maintain attitude or heading. The basic modes provide piloting comfort for the pilot of the rotary wing aircraft, but they do not correct for potential differences relative to the speed or position the pilot desires for the aircraft. Proposals have thus been made to associate higher modes of operation with the basic modes in order to eliminate potential differences in position, speed, and/or acceleration of the aircraft compared with the values desired by the pilot. These desired values are input in the form of flight setpoints that the higher autopilot modes use for bringing the aircraft to the desired position, speed, and/or acceleration, and for maintaining it. The operation of stabilizing the aircraft obtained using the basic modes is performed quickly by the autopilot, whereas the operation of re-establishing position, speed, and/or acceleration of the rotary wing aircraft is performed subsequently and more slowly by the higher modes.

By way of example, Document WO 95/34029 describes a flight control system for an aircraft enabling the speeds of the aircraft to be stabilized by operating the controls relative to the yaw, roll, and pitching axes and also relative to lift, while maintaining a heading that is constant.

The autopilot can also provide advanced functions of assisting in the guidance of the rotary wing aircraft. The possibilities made available by the higher modes are also used to obtain such assistance. The ways in which advanced functions are executed depend on predefined capabilities of the autopilot relating to the setpoint track that is to be followed by the aircraft.

Specifically, such higher autopilot modes are designed to perform instrument flight rules (IFR) operations, i.e. for piloting that can be performed solely with the assistance of flight instruments and can thus be performed with degraded vision outside the aircraft, or indeed with no outside vision.

In contrast, visual flight rules (VFR) operations are performed when the pilot can control the aircraft by looking outside the aircraft and not only with the help of instruments and flight assistance.

By way of example, the setpoint track as used for a flight mission may be determined by the pilot of the rotary wing aircraft, or else during a stage of approaching a site that is known and identified. Such a site is provided in particular with means providing interactivity between the site and the autopilot, such as radio navigation beacons. In the absence of such interactive equipment, the site is identified by the pilot of the aircraft in manual mode, and then the pilot of the aircraft activates the desired advanced functions.

The operating capabilities of the autopilot make it possible to provide automatic piloting assistance by correcting the attitude of the rotary wing aircraft in cruising flight, at high forward speeds, and when the aircraft is in a position that is remote from the ground. In a stage of cruising flight, the surroundings of the aircraft are normally empty and the pilot of the aircraft does not need to pay sustained attention to the maneuvering of the aircraft. The pilot can also avoid such sustained attention close to the ground in surroundings that are known by making use of an advanced function of the autopilot, such as during a stage of approaching a landing ground that is known and/or provided with means for identifying its surroundings.

Likewise, during a stage of approaching an intervention site that is known to the autopilot and that has been recognized and identified, activation of an advanced function is made possible, even at low speeds, for guiding the rotary wing aircraft along the corresponding setpoint track.

In addition, like a person piloting an aircraft, the autopilot conventionally controls the longitudinal, lateral, and vertical speeds of the aircraft respectively by the longitudinal cyclic pitch, the lateral cyclic pitch, and the collective pitch of the main rotor, and the collective pitch of an anti-torque rotor controlling the orientation of the aircraft about its yaw axis.

These longitudinal, lateral, and vertical speeds are defined in a reference frame tied to the aircraft having axes that are formed by the longitudinal, lateral, and vertical directions of the aircraft.

Furthermore, an autopilot can also enable the aircraft to perform coordinated turns. A coordinated turn is a turn performed without the aircraft drifting from the turn track relative to the ground, which is ground coordination, or else without any lateral load factor, which is air coordination.

With ground coordination, a turn is coordinated relative to the ground. The aircraft does not drift relative to the ground, thus enabling it to follow a ground track accurately. Such a turn that is coordinated relative to the ground is preferably used at low speed and low altitude so as to move safely in the proximity of terrain in relief or buildings, with the nose of the aircraft generally remaining in alignment with the ground track.

With air coordination, a turn is coordinated relative to the air. The aircraft does not drift relative to the air, thereby giving preference to the comfort of its occupants and minimizing the sideslip of the aircraft. Such a turn that is coordinated relative to the air is preferably used in cruising flight, i.e. at high speed and high altitude, and far away from any obstacles.

U.S. Pat. No. 5,213,283 describes a control system for performing a coordinated turn. That control system automatically supplies a yaw control signal in response to the pilot issuing a banking control signal while making such a coordinated turn, with the pilot's workload thus being reduced.

In addition, Document WO 2012/134447 describes a flight control system for an aircraft enabling a coordinated turn to be performed throughout the flight envelope, thereby minimizing the pilot's workload. At high speed, that control system makes use firstly of changes in the angle of attack of the aircraft to control heading and also lateral acceleration, and secondly of the air speed of the aircraft for controlling heading, so as to perform a coordinated turn relative to the air. At low speed, the control system makes use of the sideslip angle of the aircraft in order to maintain the heading in alignment with the track of the aircraft, thus performing a coordinated turn relative to the ground. In a transition zone between those two flight envelopes, the sideslip angle of the aircraft and its lateral acceleration are used to maintain the aircraft in a coordinated turn.

Furthermore, rotary wing aircraft are powered aircraft designed to be capable of flying in a variety of conditions that can sometimes be difficult, both in terms of atmospheric conditions, such as the presence of a strong wind and varying visibility conditions, and in terms of flight conditions, such as flying at low speeds or hovering, or indeed conditions involving the surroundings, such as being close to ground that is unknown or poorly known.

In difficult flight conditions, the pilot of the rotary wing aircraft is likely to need to take account of unexpected factors. It can then be awkward, or even impossible, for the pilot of the aircraft to make use of automatic assistance in maneuvering the aircraft under such difficult flying conditions. For example, when the aircraft is close to the ground, it must be possible for any change in its behavior to be implemented quickly. When the autopilot is using an advanced function implementing its higher modes of operation, it has difficulty in implementing a rapid modification to a track that is to be followed by the aircraft.

Under such difficult flying conditions, the use of IFR piloting can be dangerous and VFR piloting is to be preferred, but the pilot can nevertheless make use of assistance and/or certain instruments of the aircraft. Such conditions include in particular visual meteorological conditions (VMC) and degraded visual environment (DVE) conditions. The pilot may then find it necessary to make frequent adjustments to the speed and/or the track of the aircraft in order to avoid possible obstacles and in order to approach particular positions, e.g. if there is a strong side wind.

Document FR 2 777 535 describes a flight control system for an aircraft that makes it possible in particular to control lateral speed relative to the ground while maintaining a constant heading, e.g. for the purpose of compensating a strong side wind. That control system also makes it possible to maintain a constant direction for the speed of the aircraft, and thus for its track, while changing its heading and/or its longitudinal speed.

Furthermore, Document WO 2012/134460 describes a flight control system for an aircraft that makes it possible at a low speed to maintain a track that is constant relative to the ground while changing heading. The control system acts on the pitching and roll controls in order to maintain the track, with the pilot being able to cause the aircraft to move in rotation at any moment by means of those controls.

Likewise, Document WO 2012/096668 describes a flight control system for an aircraft that makes it possible to control the vertical speed of the aircraft, its flight path angle relative to the ground, and/or a height relative to the ground depending on its forward speed. Below a predetermined forward speed threshold, corresponding to a flight situation close to hovering, the flight control system makes it possible to maintain a height relative to the ground. Above that predetermined forward speed threshold, the flight control system then enables a vertical speed of the aircraft to be maintained or else it enables a flight path angle relative to the ground to be maintained.

Furthermore, Document FR 2 814 433 describes a flight control device for an aircraft in which an action on a control member can have different effects depending on the speed in translation of the aircraft. Thus, if this speed in translation of the aircraft is less than or equal to a predetermined threshold, an action on the control member acts directly on the speed in translation. In contrast, if the speed in translation of the aircraft is greater than the predetermined threshold, then an action on the control member acts, by way of example, on the acceleration in translation of the aircraft, or indeed on its angular speed.

Finally, Document WO 2013/012408 describes a flight control system for an aircraft that makes it possible automatically for the aircraft to engage hovering flight starting from forward flight, and also enables a position to be maintained in hovering flight.

Furthermore, when a rotary wing aircraft is flying with a forward speed that is not zero, it is known that an action on a flight control in a single direction leads to a plurality of flight parameters being modified and in particular to a plurality of parameters relating to the flight track of the aircraft. Consider a flight that is taking place along a track $T_{sol}$ relative to the ground and that is characterized by a ground course angle $TK_{sol}$, a forward speed Va, a flight path angle P, and a heading $\Psi$.

By way of example, a longitudinal action on a control lever leads to the longitudinal cyclic pitch of the blades of the main rotor being modified and consequently to at least the forward speed Va and the flight path angle of the aircraft being modified. In addition, if the heading of the aircraft is different from its ground course angle $TK_{sol}$, then the ground course angle $TK_{sol}$ is also modified. Furthermore, if the aircraft is traveling at a high forward speed Va, the ground course angle $TK_{sol}$ of the aircraft may also be modified, whether or not the heading of the aircraft and the ground course angle $TK_{sol}$ are identical or different.

Likewise, a transverse action on a control lever leads to the lateral cyclic pitch of the blades of the main rotor being modified and consequently leads to at least the ground course angle $TK_{sol}$ and the flight path angle of the aircraft being modified.

Finally, a vertical action on a control lever leads to the collective pitch of the blades of the main rotor being modified and consequently to at least the forward speed Va and the flight path angle of the aircraft being modified. In addition, if the heading of the aircraft is different from its ground course angle $TK_{sol}$, then its ground course angle $TK_{sol}$ is also modified.

Furthermore, it is also known that in order to modify only one of these flight track parameters of an aircraft during cruising flight, it is necessary to act simultaneously in several directions on the flight controls of the aircraft.

For example, in order to modify only the forward speed Va of the aircraft without changing its flight path angle or its ground course angle $TK_{sol}$, the pilot of the aircraft needs to act at least on the longitudinal cyclic pitch of the blades of the main rotor in the longitudinal direction and also on the collective pitch of the blades of the main rotor in the vertical direction. Furthermore, if the heading $\Psi$ of the aircraft is different from its ground course angle $TK_{sol}$, the pilot also needs to act on the lateral cyclic pitch of the blades of the main rotor in the transverse direction.

It is thus difficult for a pilot of a rotary wing aircraft to modify manually only one parameter relating to the flight track of the aircraft.

However, during hovering flight of a rotary wing aircraft, an action on a single control member, such as the collective pitch lever or the pedals, may lead to only one flight characteristic of the aircraft being modified, for example respectively its vertical speed or its heading $\Psi$.

BRIEF SUMMARY OF THE INVENTION

An object of the present invention is thus to provide a flight control system and a flight control method that make it possible for a rotary wing aircraft to maintain track while avoiding the above-mentioned limitations, and making it possible in particular for the pilot of the aircraft to modify each parameter of the flight track easily, simply, and in independent manner.

According to the invention, a flight control method for enabling a rotary wing aircraft to maintain track or to maintain heading is for use in a rotary wing aircraft having at least one control member that is provided jointly with a plurality of movement axes A, B, C, D and an autopilot that generates control signals in predefined modes of operation and depending on flight setpoints.

The aircraft flies while maintaining a track $T_{sol}$ relative to the ground with a ground course angle $TK_{sol}$, a forward speed Va non null, a flight path angle P, and a heading $\Psi$. The aircraft is characterized by three preferred directions, a longitudinal direction X extending from the rear of the aircraft towards the front of the aircraft, an elevation direction Z extending upwards perpendicularly to the longitudinal direction X, and a transverse direction Y extending from left to right perpendicularly to the longitudinal and elevation directions X and Z.

The longitudinal direction X is the roll axis of the aircraft, the transverse direction Y is its pitching axis, and the elevation direction Z is its yaw axis.

The aircraft has at least one rotary wing provided with a plurality of main blades of pitch that is variable collectively and cyclically about respective pitch axes, enabling the aircraft to perform movements in rotation about those directions X, Y, Z and movements in translation along those directions X, Y, Z. The control signals from the autopilot can give rise to these movements of the aircraft in rotation and/or in translation relative to the directions X, Y, Z.

The flight control system is remarkable in that, in a main mode of operation of the flight control system, at least one control member is movable relative to a first movement axis A in order to act, independently of the flight path angle P and the ground course angle $TK_{sol}$, to modify the forward speed Va by means of a first action relative to this first movement axis A and by means of the autopilot. Likewise, this at least one control member is movable relative to a second movement axis B in order to act, independently of the flight path angle P and of the forward speed Va, to modify the ground course angle $TK_{sol}$ by taking a second action relative to this second movement axis B and by means of the autopilot, and this at least one control member is movable relative to a third movement axis C to act, independently of the ground course angle $TK_{sol}$ and of the forward speed Va, to modify the flight path angle P by taking a third action relative to the third movement axis C and by means of the autopilot.

The rotary wing aircraft has at least one rotary wing with an axis of rotation that is substantially vertical, i.e. parallel to the elevation direction Z, and it may be built with a variety of architectures. By way of example, the aircraft may have a single rotary wing formed by a main rotor providing the aircraft with lift and propulsion, together with an anti-torque tail rotor having an axis of rotation that is substantially horizontal, i.e. parallel to the transverse direction Y. The anti-torque tail rotor also serves to perform maneuvers about the yaw axis.

In another example, the aircraft has two rotary wings formed by two contrarotating main rotors that may either be in tandem or else on the same axis. The aircraft may also have at least one rotary wing, such as a main rotor, providing the aircraft mainly with its lift, and one or more propulsive propellers having axes of rotation that are substantially horizontal, i.e. parallel to the longitudinal direction X and serving to provide the aircraft with propulsion. Such an aircraft then constitutes a hybrid helicopter.

In addition, a rotary wing aircraft may include aerodynamic elements such as stabilizers or wings, in particular in hybrid helicopters. Such aerodynamic elements may include moving portions in order to facilitate maneuvering the aircraft, in particular in cruising flight.

Whatever the architecture of the aircraft, the pilot of the aircraft can modify the behavior in flight of the aircraft by acting on one or more control levers that serve to vary the cyclic pitch and/or the collective pitch of the main blades of each rotary wing, and also control means such as pedals for varying the collective pitch of the secondary blades of a tail rotor, or indeed a joystick for varying the collective pitch of the secondary blades of at least one propulsive propeller. Likewise, if aerodynamic elements are present on the aircraft, the pilot of the aircraft may also cause their moving portions to move in order to modify the behavior in flight of the aircraft.

These pitch variations and these movements of moving portions serve to generate movements in rotation and/or translation of the aircraft relative to the directions X, Y, Z or variations in the angular and/or linear speeds of the aircraft relative to the same directions X, Y, Z. These movements in rotation and in translation of the aircraft take place in a reference frame tied to the aircraft and formed by the directions X, Y, Z.

In contrast, the aircraft also travels along a track $T_{sol}$ that is determined relative to the ground in order to reach a destination on the ground, such as a landing ground. It is considered that the aircraft travels along a track $T_{sol}$ when its center of gravity follows the track $T_{sol}$. The track $T_{sol}$ is defined in a terrestrial geographical reference frame, i.e. a reference frame that is stationary relative to the terrestrial globe and in which the aircraft can move. By way of example, this terrestrial geographical reference frame is formed from cardinal points, e.g. the directions north and east, and also a vertical direction such as the terrestrial gravity direction.

A flight of an aircraft along the track $T_{sol}$ is thus characterized by a ground course angle $TK_{sol}$ measured relative to the direction of magnetic north or of geographical north, in a horizontal plane of the terrestrial geographical reference frame. The aircraft travels along this track $T_{sol}$ with different parameters for said track $T_{sol}$ that are the ground course angle $TK_{sol}$, a forward speed Va, a flight path angle P, and a heading $\Psi$. The forward speed Va of the aircraft is its speed along the direction of the track $T_{sol}$. The forward speed Va may be the forward speed of the aircraft relative to the ground or the forward speed of the aircraft relative to the air.

The forward speed of the aircraft relative to the ground is generally used as the forward speed Va when flying at low altitudes, i.e. when the aircraft is close to obstacles such as terrain in relief and buildings. In contrast, the forward speed of the aircraft relative to the air is used as the forward speed Va essentially during cruising flight at high altitudes, i.e. when the aircraft is remote from any obstacle.

The flight path angle P of the aircraft is the angle formed between the direction of the track $T_{sol}$ and a horizontal orientation of the terrestrial reference frame in which the track $T_{sol}$ is defined, i.e. relative to a plane perpendicular to the vertical direction formed by the terrestrial gravity direction.

Nevertheless, causing the aircraft to travel along a flight path angle P has meaning only above a certain forward speed, specifically about 20 knots (kt). When the forward speed of the aircraft is less than this forward speed, which is typically equal to 20 kt, the piloting of the aircraft can be performed by replacing the flight path angle P with the vertical speed $W_Z$ of the aircraft, this vertical speed $W_Z$ being in the elevation direction Z.

A third action on this at least one control member relative to a third movement axis C then acts, independently of the ground course angle $TK_{sol}$ and of the forward speed Va, to modify the vertical speed $W_Z$ of the aircraft by means of the autopilot.

The heading $\Psi$ of the aircraft is the angle formed between the north direction and the projection onto the horizontal plane of the terrestrial reference frame of the longitudinal direction X of the aircraft. Thus, when the heading $\Psi$ and the ground course angle $TK_{sol}$ are equal, the nose of the aircraft is pointing along the track $T_{sol}$. As a result, the longitudinal direction X is in alignment with the track $T_{sol}$. Otherwise, the nose of the aircraft does not lie on the track $T_{sol}$ and the track $T_{sol}$ is then not in alignment with the longitudinal direction X, it being understood that a rotary wing aircraft possesses the ability to advance in any direction independently of its own longitudinal direction X.

When the pilot seeks to modify one or more parameters of this first type of characterization of the track $T_{sol}$, the pilot cannot act directly on the ground course angle $TK_{sol}$, but generally needs to act on a plurality of flight parameters including the collective and cyclic pitches of the main blades of at least one main rotor, and possibly also the collective pitch of a tail rotor or of at least one propulsive propeller, or indeed the movement of at least one moving portion of an aerodynamic element. In addition, it is practically impossible for the pilot acting manually on the flight parameters to modify only one of these parameters of the track $T_{sol}$ without at least one other parameter of the track $T_{sol}$ also being modified. Furthermore, depending on the architecture of the rotary wing aircraft, it is possible to modify at least one of these parameters of the track $T_{sol}$ by acting equally well on several flight parameters of the aircraft.

For example, it is possible to modify the forward speed Va of a hybrid helicopter by acting either on the propulsive propellers or on the main rotor. In contrast, if the heading $\Psi$ of the aircraft is different from its ground course angle $TK_{sol}$, then acting solely on the propulsive propellers or on the main rotor will modify the forward speed Va, and also the ground course angle $TK_{sol}$.

In addition, the pilot may have frequent need to adjust this track $T_{sol}$, in particular when flying at sight and at low altitude, in order to approach targets as a function of the surroundings and/or of weather conditions. The aircraft may fly close to buildings or to terrain in relief and/or it may be subjected to a strong wind, such as a side wind, that may influence the pilot's maneuvers.

Advantageously, the flight control system of the invention makes it possible to maintain track $T_{sol}$ while acting directly and independently on these parameters of the track $T_{sol}$ by means of control members and of the movement axes A, B, C, D of these control members. The three parameters guaranteeing that the track $T_{sol}$ of the aircraft is followed are the ground course angle $TK_{sol}$, the forward speed Va, and the flight path angle P or else the vertical speed $W_Z$ as appropriate. The heading $\Psi$ corresponds to the yaw angle of the aircraft between the longitudinal direction X and north, and it may be managed independently of the track $T_{sol}$, since a rotary wing aircraft has the special feature of being able to advance in any direction independently of its longitudinal direction X.

Thus, an action on a control member relative to three movement axes A, B, C, D makes it possible, by means of the autopilot which acts on the various flight parameters, to modify respectively and independently the ground course angle $TK_{sol}$, the forward speed Va, and the flight path angle P, or indeed the vertical speed $W_Z$ as the case may be. Such an action relative to these movement axes A, B, C, then modifies the flight setpoints supplied to the autopilot, which generates control signals in order to implement the pilot's request. For this purpose, the autopilot may act on one or more flight parameters of the aircraft, such as the collective and cyclic pitches of the main blades of a main rotor, the collective pitch of the secondary blades of a tail rotor, or indeed of at least one propulsive propeller, or indeed movements of the moving portions of aerodynamic elements present on the aircraft, if any, in order to obtain this modification to a single parameter of the track $T_{sol}$ of the aircraft.

In addition, the pilot acting relative to a fourth movement axis D of a control member also enables a parameter of the track $T_{sol}$ of the aircraft to be modified. For example, the heading $\Psi$ may be modified by taking an action relative to this fourth movement axis D.

Furthermore, the heading $\Psi$ may be modified directly by the pilot of the aircraft acting on the pedals conventionally present in an aircraft, e.g. by modifying the collective pitch of an anti-torque tail rotor. Consequently, the pilot acting relative to a fourth movement axis D by using a control member can enable some other parameter of the track $T_{sol}$ of the aircraft to be modified. Preferably, an action of the pilot relative to this fourth movement axis D makes it possible to modify the ground course angle $TK_{sol}$, the pilot thus having two options for modifying the ground course angle $TK_{sol}$ by means of two movement axes B and D.

Advantageously, using these two movement axes B and D to act solely on the ground course angle $TK_{sol}$ enables the pilot to have greater flexibility in modifying this ground course angle $TK_{sol}$, e.g. by using either hand, thereby making it easier to string together maneuvers and/or changes to the parameters of the track $T_{sol}$ of the aircraft.

Nevertheless, the heading $\Psi$ may be modified without the pilot acting directly on the heading $\Psi$ in the event of the pilot acting on a control member in order to modify the ground course angle $TK_{sol}$ or the forward speed Va.

For example, during particular flying conditions, essentially in strong wind, certain limiting angles between the longitudinal direction X and the track $T_{sol}$ can lead to flight that is uncomfortable for the occupants or even dangerous. In particular, aligning the longitudinal direction X of the aircraft with its track $T_{sol}$ in the presence of a strong side wind can lead to such particular conditions.

In these particular flight conditions, the heading $\Psi$ can be modified by the autopilot of the flight control system of the invention during variations in the ground course angle $TK_{sol}$ or in the forward speed Va so as to avoid reaching such limiting angles.

Likewise, a modification to the heading $\Psi$ under the control of the pilot, e.g. by means of pedals of the aircraft, can lead to the autopilot modifying the ground course angle $TK_{sol}$ in order to avoid reaching such limiting angles.

Naturally, the pilot may also act simultaneously on a plurality of movement axes A, B, C, D, with the autopilot generating control signals in order to modify the parameters of the track $T_{sol}$ as requested by the pilot, but without modifying other parameters of the track $T_{sol}$.

Furthermore, during these actions of the pilot on the control members and following these actions, one or more parameters of the track $T_{sol}$ of the aircraft are modified in order to follow a new track $T_{sol}$. New flight setpoints of the autopilot are then aligned on the parameters of the new track $T_{soln}$, i.e. a new ground course angle $TK_{soln}$, a new forward speed $Va_n$, a new flight path angle $P_n$ or else a new vertical speed $W_{Zn}$ as appropriate, and/or a new heading $\Psi_n$. Thus, the flight control system of the invention enables the pilot to modify the track $T_{sol}$ of the aircraft by acting directly on the parameters of the track $T_{sol}$ and enables the autopilot to follow automatically the new track $T_{soln}$ selected by the pilot.

The flight setpoints are said to be "aligned" on the parameters of the new track $T_{soln}$ when the initial flight setpoints are modified so as to take values that correspond to the new track $T_{soln}$.

A rotary wing aircraft generally includes at least a first control lever enabling the cyclic pitch of a main rotor to be modified and a second control lever enabling the collective pitch of the main rotor to be modified. The first control lever has two movement axes making it possible simultaneously to control movements in rotation of the aircraft about both the longitudinal direction X and the transverse direction Y. The second control lever has only one movement axis and serves to control movements in translation of the aircraft along the elevation direction Z.

Furthermore, such a rotary wing aircraft generally has pedals for controlling an anti-torque device, e.g. by modifying the collective pitch of an anti-torque tail rotor, thus controlling the yaw angle of the aircraft, and consequently its heading $\Psi$. When such an aircraft has aerodynamic elements provided with moving portions, it may also have control means for controlling the movements of the moving portions. The movements of these moving portions may also be coupled to the first and second levers.

The flight control system of the invention thus has two control levers which together then provide three movement axes.

In a first secondary mode of operation of this flight control system of the invention, the first control member is the first control lever and the second control member is the second control lever, the first control member having the first movement axis A and the second movement axis B, the second control lever having the third movement axis C. These first and second levers thus enable the aircraft to be piloted while maintaining track along the track $T_{sol}$ by means of the autopilot.

An action on the first control lever relative to the first movement axis A then enables the forward speed Va of the aircraft on the track $T_{sol}$ to be modified by means of the autopilot. Likewise, an action on the first control lever relative to the second movement axis B enables the ground course angle $TK_{sol}$ to be modified by means of the autopilot. Finally, an action on the second control lever relative to the third movement axis C enables the flight path angle P of the aircraft or else its vertical speed $W_Z$, as the case may be, to be modified by means of the autopilot.

As a result, the aircraft has first and second control levers that may be control members that jointly form three movement axes A, B, C depending on the mode of operation of the flight control system of the invention.

Nevertheless, this first secondary mode of operation of the flight control system of the invention is not suitable for making the aircraft perform sudden maneuvers, e.g. for the purpose of avoiding obstacles to be found on the track $T_{sol}$ or close thereto. The first and second control levers in this first secondary mode of operation of the control system enable piloting to be performed while maintaining track, i.e. enable the flight parameters to be modified so as to follow the track $T_{sol}$ with the help of the autopilot. The first and second control levers thus do not make it possible to cause the aircraft to move quickly in a vertical or lateral direction.

A sudden obstacle-avoiding maneuver is generally performed solely by moving in rotation about the pitching axis, i.e. by using the first control lever so as to perform a vertical movement. However such a maneuver about the pitching axis, as obtained by longitudinal variation of the cyclic pitch, can be accompanied by the pilot acting on the second control lever thus leading also to a variation in the collective pitch.

During this first secondary mode of operation of the control system of the invention, a violent action by the pilot on at least one of the first and second control levers, and preferably on the first control lever only, causes the first secondary mode of operation of the control system to be deactivated. The control system of the invention can then switch to another mode of operation, preferably to a mode of operation involving piloting by transparency or else a manual mode of operation.

For example, after such a sudden action of the pilot has been detected and after switching over to a mode of operation for piloting by transparency, the pilot can, by transparency, control the pitching of the aircraft by using the first control lever so as to cause the aircraft to move in rotation about the transverse direction Y. The flight path angle P is then no longer considered to be a flight setpoint for maintaining track and thus is not controlled by the autopilot in order to avoid countering the avoidance maneuver. Furthermore, the collective pitch remains constant except for pilot action by transparency on the second control lever in order to cause the aircraft to move in translation along the elevation direction Z.

The term "violent" action is used to mean an action of large amplitude of the pilot of the aircraft on either one of the two control levers. Such a large amplitude action can be considered as the pilot making a request to avoid an obstacle, given that piloting for maintaining track or for maintaining heading is performed by small amplitude movements in order to obtain modification to the track $T_{sol}$.

Furthermore, the flight control system of the invention may include control members that are dedicated to piloting the aircraft while maintaining track along the track $T_{sol}$ by means of the autopilot.

The flight control system of the invention may for example include a first control member positioned on the first control lever and a second control member positioned on the second control lever. The first control member has the first movement axis A and the second movement axis B, while the second control member has the third movement axis C and possibly the fourth movement axis D.

The flight control system thus has two control members operating jointly relative to at least three movement axes A, B, C and possibly four movement axes A, B, C, D. A first control member is provided with two movement axes A, B and a second control member is provided with one or two movement axes C, D.

In a second secondary mode of operation of this flight control system of the invention, the control members make it possible to act directly to control movements in rotation of the aircraft about the longitudinal and transverse directions X and Y and also movements of the aircraft in translation along the elevation direction Z.

A first control member serves for example to control the movements in rotation of the aircraft about the longitudinal and transverse directions X and Y by means of the autopilot, and a second control member controls the movements in translation of the aircraft along the elevation direction by means of the autopilot.

Such control members are generally calibrated and thus control precise and predetermined movements of the aircraft. Thus, regardless of the mode of operation of the control members and of the autopilot, when the pilot acts on one of the control members by exerting a tap or a long press relative to a movement axis A, B, C, D, then one of the parameters of the track $T_{sol}$ is varied by a predetermined value. Such control members are often referred to as "beeps".

For example, in the main mode of operation of the control system of the invention, in the event of a long press on a control member relative to the movement axis A, the aircraft accelerates or decelerates by 1.5 knots per second (kt/s) on the track $T_{sol}$ so long as this press is maintained. Thereafter, when the pilot releases the control member relative to the movement axis A, the autopilot aligns its flight setpoints on the new forward speed $Va_n$ of the aircraft.

Likewise, during a long press on a control member relative to the movement axis B or the movement axis D, the ground course angle $TK_{sol}$ of the aircraft is varied at a rate that is typically 3 degrees per second (°/s) so long as this long press is maintained. Thereafter, when the pilot releases this control member relative to the movement axis B or D, the autopilot aligns its flight setpoint on the new ground course angle $TK_{soln}$ of the aircraft in order to follow a new track $T_{sol}$.

Finally, after tapping a control member relative to the movement axis C, the flight path angle P of the aircraft varies by a value of 0.1% of the angle on each tap and the flight path angle P varies at a rate of 0.3% per second (%/s) when a long press is applied to the control member and for so long as the press is maintained. Thereafter, after each tap or when the pilot releases this long press on the control member relative to the movement axis C, the autopilot aligns its flight setpoint on the new flight path angle $P_n$ of the aircraft.

Nevertheless, below a certain forward speed, the aircraft flying along a specified flight path angle P is not meaningful, and the piloting of the aircraft can be performed with respect to its vertical speed $W_Z$. Under such circumstances, an action on a control member relative to the movement axis C modifies the vertical speed $W_Z$ of the aircraft. A long press on the control member relative to the movement axis C while the aircraft is flying at a forward speed less than the certain forward speed, causes the aircraft to accelerate or decelerate vertically, e.g. by 150 ft/min so long as this press is maintained. Thereafter, when the pilot releases the control member relative to the movement axis C, the autopilot generally aligns its flight setpoints on the new vertical speed $W_{Zn}$.

The present invention also provides a flight control method for a rotary wing aircraft, the aircraft flying while maintaining a track $T_{sol}$ relative to the ground with a ground course angle $TK_{sol}$, a forward speed Va, a flight path angle P, and a heading Ψ.

The aircraft has three preferred directions, a longitudinal direction X extending from the rear of the aircraft towards the front of the aircraft, an elevation direction Z extending upwards perpendicularly to the longitudinal direction X, and a transverse direction Y extending from left to right perpendicularly to the longitudinal and elevation directions X and Z.

The aircraft has at least one rotary wing, with a plurality of main blades having collective pitch and cyclic pitch that are variable about respective pitch axes, and an autopilot for generating control signals in compliance with predefined operating modes and flight setpoints. The aircraft can then perform movements in rotation about these directions X, Y, Z and in translation along these directions X, Y, Z, the control signals from the autopilot being capable of causing the aircraft to move in rotation and/or in translation relative to the directions, X, Y, Z.

The aircraft also has a flight control system including at least one control member provided jointly with a plurality of movement axes A, B, C, D.

This flight control method for a rotary wing aircraft enables track to be maintained and includes a plurality of steps, including:

controlling a modification to the forward speed Va by taking a first action relative to a first movement axis A of a first control member and by means of the autopilot;

controlling a modification to the ground course angle $TK_{sol}$ by taking a second action relative to a second movement axis B of the first control member and by means of the autopilot; and controlling a modification to the flight path angle P or else to the vertical speed $W_Z$ as the case may be by taking a third action relative to a third movement axis C of a second control member and by means of the autopilot.

The flight control method of the invention also makes it possible for the ground course angle $TK_{sol}$ of the aircraft relative to ground to be modified by taking a fourth action relative to a fourth movement axis D of a control member and by means of the autopilot.

While the pilot is taking these actions on the control members, and after these actions, one or more parameters of the track $T_{sol}$ of the aircraft are modified so as to cause it to follow a new track $T_{soln}$. New flight setpoints for the autopilot are then aligned on the parameters of the new track $T_{sol}$, i.e. a new ground course angle $TK_{soln}$, a new forward speed $Va_n$, a new flight path angle $P_n$ or else a new vertical speed $W_{Zn}$ as the case may be, and/or a new heading $\Psi_n$. Thus, the flight control method of the invention enables the pilot to modify the track $T_{sol}$ of the aircraft by acting directly on the parameters of the track $T_{sol}$ and enables the autopilot to follow the new track $T_{soln}$ selected by the pilot.

Furthermore, the flight control system of the aircraft has two control members jointly providing at least three movement axes A, B, C or indeed four movement axes A, B, C, D. For example, the flight control system has two control members, a first control member having two movement axes A, B and a second control member having one or two of the movement axes C, D.

In addition, the flight control system of the aircraft may have a first control lever enabling the cyclic pitch of the main blades of a main rotor to be varied and a second control lever enabling the collective pitch of the main blades of the main rotor to be varied. The first control lever has two movement axes serving in particular to control movements in rotation of the aircraft about longitudinal and/or transverse directions X and Y. The second control lever has a single movement axis and serves in particular to control movements of the aircraft in translation along the elevation direction Z.

In a first secondary mode of operation of the flight control method of the invention, the first control member is the first control lever and the second control member is the second control lever, the first control lever having the first movement axis A and the second movement axis B, the second control member having the third movement axis C.

In a second secondary mode of operation of the flight control method of the invention, it is possible to control movements in rotation of the aircraft directly about the longitudinal and transverse directions X and Y and also movements in translation of the aircraft along the elevation direction Z by means of at least one of the control members, with or without assistance from the autopilot.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 shows an aircraft having flight control of the invention;

FIG. 2 is a block diagram of a flight control method of the invention;

FIGS. 3 and 4 are two detail views of control levers of a rotary wing aircraft; and FIG. 5 is a diagram showing the ground course angle and the heading of the aircraft.

Elements shown in more than one of the figures are given the same references in each of them.

DETAILED DESCRIPTION OF THE INVENTION

In FIG. 1, there can be seen an aircraft 10 that has a main rotor 11 positioned above a fuselage 13 and an anti-torque tail rotor 12 positioned at the tail end of a tail boom 14. The aircraft 10 also has an instrument panel 5, a seat 20 on which a pilot of the aircraft 10 can sit, an autopilot 15, and manual control means made up in particular of two control levers 21 and 22, and of pedals 23.

Furthermore, an X, Y, Z reference frame is attached to the aircraft 10, and more particularly to its center of gravity. The longitudinal direction X extends from the rear of the aircraft to the front of the aircraft 10, the elevation direction Z extends upwards perpendicularly to the longitudinal direction X, and the transverse direction Y extends from left to right perpendicularly to the longitudinal and elevation directions X and Z.

The longitudinal direction X is the roll axis of the aircraft 10, the transverse direction Y is its pitching axis, and the elevation direction Z is its yaw axis.

The main rotor 11 has an axis of rotation that is substantially vertical, i.e. parallel to the elevation direction Z, and it is provided with three main blades 111, 112, 113 having collective pitch and cyclic pitch that are variable under the control of the control levers 21, 22 and of the autopilot 15. In similar manner, the tail rotor 12 has its axis of rotation substantially horizontal, i.e. parallel to the transverse direction Y, and it is provided with four secondary blades 121, 122, 123, 124 of collective pitch that is variable and controllable by means of the pedals 23 and of the autopilot 15.

More precisely, the first control lever 21 is movable about the longitudinal and transverse directions X and Y and serves to control the cyclic pitch of the main blades 111, 112, 113 by means of a first control linkage 24. The second control lever 22 is movable about the transverse direction Y and controls the collective pitch of the main blades 111, 112, 113 by means of a second control linkage 25. Taking action on the first control lever 21 then serves to control movements in rotation of the aircraft 10 about the longitudinal and transverse directions X and Y, and taking action on the second control lever then serves to control movements in translation of the aircraft 10 along the elevation direction Z.

Likewise, the pedals 23 control the collective pitch of the secondary blades 121, 122, 123, 124 via a third control linkage 26. Taking action on the pedals 23 then serves to control movements in rotation of the aircraft 10 about its yaw axis.

The control linkages 24, 25, 26 serve to actuate the various blades and may for example be made up of connections that are entirely mechanical between the manual control means 21, 22, 23 and the blades. These control linkages 24, 25, 26 may also be made up of mechanical connections associated with hydraulic actuator means, or indeed electrical connections associated with such hydraulic actuator means.

The autopilot 15 also serves to control the collective and cyclic pitches of the main blades 111, 112, 113, and also the collective pitch of the secondary blades 121, 122, 123, 124 by acting respectively on the same control linkages 24, 25, 26. The autopilot 15 then serves to control movements in rotation of the aircraft 10 about the longitudinal and transverse directions X and Y and movements in translation of the aircraft 10 along the elevation direction Z, and also movements in rotation of the aircraft 10 about its yaw axis.

FIGS. 3 and 4 show in greater detail the respective grip zones of the first and second control levers 21 and 22. The grip zone of each control lever 21, 22 includes in particular a respective control member 31, 32. Each control member 31, 32 is movable about two specific movement axes A & B, C & D. A first control member 31 present on the first control lever 21 and shown in FIG. 3 is movable about two movement axes A and B. In similar manner, a second control member 32 present on the second control lever 22 and shown in FIG. 4 is movable about two movement axes C and D.

A flight control system 1 is made up of manual control means 21, 22, 23, of the control members 31, 32, of the autopilot 15, and of the control linkages 24, 25, 26.

The aircraft 10 can fly along a track $T_{sol}$ relative to the ground, this track $T_{sol}$ being determined relative to the ground and defined in a terrestrial geographical reference frame, e.g. determined by the cardinal points and the direction of terrestrial gravity.

A flight of an aircraft 10 along the track $T_{sol}$ is characterized by using different parameters for the track $T_{sol}$, a ground course angle $TK_{sol}$ between the direction of the track $T_{sol}$ and the direction of north in a horizontal plane of the terrestrial geographical reference frame, a forward speed Va of the aircraft 10, a flight path angle P formed by the angle between the direction of the track $T_{sol}$ and the horizontal orientation of the terrestrial reference frame, and a heading Ψ which is the angle formed between the direction of north and the projection of the longitudinal direction X of the aircraft 10 onto a horizontal plane of the terrestrial reference frame.

The forward speed Va of the aircraft 10 is the speed of the aircraft 10 along the direction of the track $T_{sol}$, and this speed may be defined relative to the ground or else relative to the air.

FIG. 5 shows a projection onto a horizontal plane of the terrestrial reference frame of a track $T_{sol}$. The longitudinal and transverse directions X, Y of the aircraft 10 are also shown as are the directions N, W of the terrestrial geographical reference frame.

The heading Ψ is thus shown between the longitudinal direction X of the aircraft 10 and the direction N of north. The course angle $TK_{sol}$ on the ground is shown between the direction of the track $T_{sol}$ and the direction N of north.

It can be seen that the heading Ψ is different from the ground course angle $TK_{sol}$. Consequently, the nose and the tail boom 14 of the aircraft 10, which are in alignment on the longitudinal direction X, are not in alignment with the track $T_{sol}$. Likewise, the forward speed Va is in alignment with the track $T_{sol}$ and is not parallel to the longitudinal direction X.

The aircraft 10 travels generally along a track $T_{sol}$ in order to reach a target on the ground, such as a landing ground. Nevertheless, the pilot may need to modify one or more parameters of the track $T_{sol}$, e.g. in order to slow down, avoid an obstacle not listed in a database of the aircraft 10, or merely in order to change route. Such modifications are necessary in particular when performing visual flight and at low altitude, and as a function of the surroundings and/or of weather conditions.

In order to modify at least one of the parameters of the track $T_{sol}$, the pilot must generally act by controlling essentially one or more variations to the pitch of the main blades 111, 112, 113 of the main rotor 11 and possibly also variations to the pitch of the secondary blades 121, 122, 123, 124 of the tail rotor 12. However, it is practically impossible for a pilot acting manually on at least one of the control means 21, 22, 23 to modify only one of the parameters of the track $T_{sol}$.

FIG. 2 shows a mode of operation of a flight control method while maintaining track for a rotary wing aircraft 10 that enables the pilot to modify one or more of the parameters of the track $T_{sol}$ directly. This track maintaining flight control method thus makes it possible to ensure that the track $T_{sol}$ is maintained while acting directly and independently on these track parameters $T_{sol}$ via the control members 31 and 32.

Each action on a control member 31, 32, with the help of the autopilot 15 that acts on the various flight parameters, makes it possible to modify one or more parameters of the track $T_{sol}$ respectively and independently.

The flight control system 1 enables this track maintaining flight control method to be performed.

Thus, during a first step 41, a modification is requested to the forward speed Va of the aircraft 10 by taking a first action on the control member 31 relative to the first movement axis A and by means of the autopilot 15.

During a second step 42, a modification is requested to the ground course angle $TK_{sol}$ by taking a second action on the first control member 31 relative to a second movement axis B and by means of the autopilot 15.

Thus, during a third step 43, a modification is requested to the flight path angle P by taking a third action on the second control member 32 relative to a third movement axis C and by means of the autopilot 15.

Thus, during a fourth step 44, a request is made to modify the ground course angle $TK_{sol}$ by taking a fourth action on the second control member 32 relative to a fourth movement axis D and by means of the autopilot 15.

Naturally, the pilot can also act simultaneously on one only or on both control members 31, 32 and relative to a plurality of movement axes A, B, C, D, it being possible for the steps 41, 42, 43, 44 to be performed simultaneously. The autopilot 15 then generates control signals so as to modify the parameters track $T_{sol}$ as requested by the pilot while not modifying other parameters of the track $T_{sol}$.

Furthermore, during these actions of the pilot on the control members 31, 32 and after these actions, one or more parameters of the track $T_{sol}$ of the aircraft 10 are modified so that it follows a new track $T_{sol}$. Consequently, during a fifth step 45, new flight setpoints for the autopilot 15 are aligned on the parameters of the new track $T_{soln}$, i.e. a new ground course angle $TK_{sol}$, a new forward speed $Va_n$, a new flight path angle $P_n$, and/or a new heading $Ψ_n$.

Furthermore, the track maintaining flight control method of the invention possesses two secondary modes of operation.

In a first secondary mode of operation of this flight control method of the invention, the first control lever 21 is used as a first control member 31 and the second control lever 22 is used as a second control member 32. The first control lever 31 serves to modify the forward speed Va of the aircraft along the track $T_{sol}$ by performing a movement about the transverse direction Y that corresponds to the first movement axis A and enables the ground course angle $TK_{sol}$ to be modified by performing a movement about the longitudinal direction X which then corresponds to the second movement axis B.

Likewise, the second control lever 22 enables the flight path angle P of the aircraft 10 to be modified by performing a movement about the transverse direction Y, which then corresponds to the third movement axis C. The first and second levers 21 and 22 thus enable the aircraft 10 to be controlled while maintaining track along the track $T_{sol}$ by means of the autopilot 15. This first secondary mode of operation is possible when the linkages 24, 25, 26 are constituted by electrical connections, for example.

Nevertheless, this first secondary mode of operation is not appropriate if the pilot needs to take urgent action to perform a sudden maneuver of the aircraft 10, e.g. in order to avoid an obstacle that is to be found on the track $T_{sol}$ or else close thereto. The first and second control levers 21 and 22 do not enable the aircraft to perform a vertical or lateral movement quickly in this first secondary mode of operation.

This first secondary mode of operation is therefore deactivated as soon as it is detected that the pilot has taken violent action on the first control lever 21. Thereafter, the first and second control levers 21 and 22 operate in a mode of operation for piloting by transparency or else in a manual mode of operation, then enabling the pilot to perform the necessary avoidance maneuver.

In a second secondary mode of operation of this flight control method of the invention, the control members 31, 32 may be used respectively while in the manual mode of operation of the first and second levers 21, 22. The control members 31, 32 thus enable variations in the cyclic and collective pitches of the blades 111, 112, 113 of the main rotor 11 to be controlled respectively and directly.

The first control member 31 then controls movements in rotation of the aircraft 10 about the longitudinal and transverse directions X and Y by means of the autopilot 15, and the second control member 32 then controls movements in translation of the aircraft 10 along the elevation direction Z by means of the autopilot 15.

Furthermore, travel of the aircraft 10 at a flight path angle P is meaningful only above a certain forward speed of the order of 20 kt. When the forward speed of the aircraft 10 is less than this certain forward speed, the aircraft 10 can be controlled by replacing the flight path angle P with a vertical speed $W_z$ of the aircraft 10.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

In particular, the aircraft 10 with this flight control system 1 is not limited to the aircraft 10 shown in FIG. 1. By way of example, the aircraft 10 may have two main rotors or it may be a hybrid helicopter.

Furthermore, the number of main blades 111, 112, 113 of a main rotor 11, and the number of secondary blades 121, 122, 123, 124 of a tail rotor 12 are not limited to the example aircraft 10 shown in FIG. 1. A main rotor 11 or a tail rotor 12 may have two, three, four, five, or even more than five blades.

What is claimed is:

1. A flight control system for a rotary wing aircraft, the aircraft flying while maintaining track $T_{sol}$ relative to the ground with a ground course angle $TK_{sol}$, a forward speed Va, a flight path angle P, and a heading $\Psi$, a longitudinal direction X extending from the rear of the aircraft to the front of the aircraft, an elevation direction Z extending upwards perpendicularly to the longitudinal direction X, and a transverse direction Y extending from left to right perpendicularly to the longitudinal and elevation directions X and Z, the aircraft having at least one rotary wing provided with a plurality of main blades having collective pitch and cyclic pitch that are variable about respective pitch axes, the aircraft being capable of performing movements in rotation about the directions X, Y, Z and in translation along the directions X, Y, Z; and the flight control system comprising:

at least one control member provided jointly with a plurality of movement axes A, B, C, D; and an autopilot generating control signals in compliance with predefined modes of operation and in compliance with flight setpoints, the control signals being capable of causing the aircraft to perform the movements in rotation and/or translation relative to the directions X, Y, Z;

wherein:

at least one control member is movable relative to a first movement axis A in order to lead to a modification in the forward speed Va independently of the ground course angle $TK_{sol}$ and of the flight path angle P by taking a first action relative to the first movement axis A and by means of the autopilot;

the at least one control member is movable relative to a second movement axis B in order to cause a modification to the ground course angle $TK_{sol}$ independently of the forward speed Va and of the flight path angle P by taking a second action relative to the movement axis B and by means of the autopilot; and the at least one control member is movable relative to a third movement axis C to cause a modification to the flight path angle P independently of the ground course angle $TK_{sol}$ and of the forward speed Va by taking a third action relative to the third movement axis C and by means of the autopilot.

2. A flight control system for a rotary wing aircraft according to claim 1, wherein the at least one control member is movable relative to a fourth movement axis D in order to give to a modification of the ground course angle $TK_{sol}$ by taking a fourth action relative to the fourth axis D and by means of the autopilot.

3. A flight control system for a rotary wing aircraft according to claim 1, wherein the ground course angle $TK_{sol}$, the forward speed Va, and the flight path angle P of the aircraft are aligned as new setpoints for the autopilot on each occasion action is taken on the at least one control member.

4. A flight control system for a rotary wing aircraft according to claim 1, wherein the aircraft has a first control lever enabling movements of the aircraft in rotation about the longitudinal and transverse directions X and Y to be controlled, a second control lever enabling movements of the aircraft in translation along the elevation direction Z to be controlled in a first secondary mode of operation of the flight control system, the first control member is the first control lever and the second control member is the second control lever, the first control member having the first movement axis A and the second movement axis B, and the second control member having the third movement axis C.

5. A flight control system for a rotary wing aircraft according to claim 1, wherein the aircraft has a first control lever enabling movements in translation of the aircraft about the longitudinal and transverse directions X and Y to be controlled and a second control lever enabling movements in translation of the aircraft along the elevation direction Z to be controlled, a first control member is positioned on the first control lever, and a second control member is positioned on the second control lever, the first control member including the first movement axis A and the second movement axis B, and the second control lever including the third movement axis C.

6. A flight control system for a rotary wing aircraft according to claim 5, wherein the second control member includes a fourth movement axis D.

7. A flight control system for a rotary wing aircraft according to claim 5, wherein in a second secondary mode of operation of the flight control system, at least one flight control member can control the movements in rotation of the aircraft about the longitudinal and transverse directions X and Y and also the movements in translation of the aircraft along the elevation direction Z.

8. A flight control system for a rotary wing aircraft according to claim 4, wherein a violent action on the first control lever causes the autopilot to cease maintaining the setpoints for the flight path angle P, the first control lever controlling movements in rotation of the aircraft about the longitudinal and transverse directions X and Y and the second control lever controlling movements in translation of the aircraft along the elevation direction Z.

9. A flight control system for a rotary wing aircraft according to claim 1, wherein the control members are calibrated and control precise movements of the aircraft.

10. A flight control system for a rotary wing aircraft according to claim 1, wherein the forward speed Va is the forward speed of the aircraft relative to the ground.

11. A flight control system for a rotary wing aircraft according to claim 1, wherein the forward speed Va is the forward speed of the aircraft relative to the air.

12. A flight control system for a rotary wing aircraft according to claim 1, wherein if the forward speed Va is less than a certain forward speed, the flight path angle P is replaced by the vertical speed $W_z$.

13. A flight control system for a rotary wing aircraft according to claim 12, wherein the certain forward speed is equal to 20 kt.

14. A flight control method for a rotary wing aircraft, the aircraft flying to maintain a track $T_{sol}$ relative to the ground with a ground course angle $TK_{sol}$, a forward speed Va, a flight path angle P, and a heading $\Psi$, a longitudinal direction X being from the rear of the aircraft to the front of the aircraft, an elevation direction Z extending upwards perpendicularly to the longitudinal direction X, and a transverse direction Y extending from left to right perpendicularly to the longitudinal and elevation directions X and Z, the aircraft comprising:

at least one rotary wing provided with a plurality of main blades of collective pitch and cyclic pitch that are variable about respective pitch axes, the aircraft being capable of performing movements in rotation about the directions X, Y, Z and in translation along the directions X, Y, Z;

an autopilot generating control signals in compliance with predefined modes of operation and in compliance with flight setpoints, the control signals being capable of causing the aircraft to perform the movements in rotation and/or translation relative to the directions X, Y, Z; and a flight control system including at least one control member provided jointly with a plurality of movement axes A, B, C, D;

the method comprising the following steps:

controlling a modification to the forward speed Va by taking a first action relative to a first movement axis A of a control member and by means of the autopilot;

controlling a modification to the ground course angle $TK_{sol}$ by taking a second action relative to a second movement axis B of a control member and by means of the autopilot; and controlling a modification to the flight path angle P by taking a third action relative to a third movement axis C of a control member and by means of the autopilot.

15. A flight control method for a rotary wing aircraft according to claim 14, including a step of causing a modification to the ground course angle $TK_{sol}$ of the aircraft relative to the ground by taking a fourth action relative to a fourth movement axis D of a control member and by means of the autopilot.

16. A flight control method for a rotary wing aircraft according to claim 14, wherein the ground course angle $TK_{sol}$, the forward speed Va, and/or the flight path angle P are aligned respectively as new setpoint(s) for the autopilot on each occasion action is taken on at least one control member.

17. A flight control method for a rotary wing aircraft according to claim 14, wherein in a secondary mode of operation of the flight control method, the movements in rotation of the aircraft about the longitudinal and transverse directions X and Y and the movements in translation of the aircraft along the elevation direction Z are controlled by means of at least one control member and by means of the autopilot.

18. A flight control system for a rotary wing aircraft according to claim 14, wherein if the forward speed Va is less than a certain forward speed, the flight path angle P is replaced by the vertical speed $W_z$.

* * * * *